United States Patent [19]
Machalitzky et al.

[11] 3,873,788
[45] Mar. 25, 1975

[54] STEERING COLUMN SWITCH

[75] Inventors: Otto Machalitzky, Pleidelsheim; Herbert Erdelitsch, Bietigheim, both of Germany

[73] Assignee: SWF-Spezialfabrik fur Autozubeho Gustab Rau GmbH, Bietigheim, Germany

[22] Filed: Jan. 23, 1974

[21] Appl. No.: 435,897

[30] Foreign Application Priority Data
Feb. 1, 1973  Germany............................ 2304801

[52] U.S. Cl. .............................. 200/61.27, 200/307
[51] Int. Cl. ......................................... H01h 3/16
[58] Field of Search.......... 200/61.27, 61.30, 61.34, 200/61.35, 307

[56] References Cited
UNITED STATES PATENTS
| | | | |
|---|---|---|---|
| 3,209,092 | 9/1965 | Vitaloni et al. | 200/61.34 |
| 3,511,943 | 5/1970 | Kibler | 200/61.54 |
| 3,662,336 | 5/1972 | Suzuki et al. | 200/61.27 X |

FOREIGN PATENTS OR APPLICATIONS
| | | | |
|---|---|---|---|
| 496,475 | 7/1954 | Italy | 200/61.34 |
| 1,483,270 | 4/1967 | France | 200/61.27 |

Primary Examiner—G. Harris
Attorney, Agent, or Firm—Toren, McGeady and Stanger

[57] ABSTRACT

A switch adapted to be mounted on the steering column of an automotive vehicle consists of two switching devices contained within a common switch housing. One of the switching devices can be covered within the switch housing by the other switching device or, alternatively, a single switching device can be used closed by a cover plate within the housing. The switching devices are mounted in the housing one above the other and each has a switch lever extending through the same slot in the housing. The lower switching device has terminals mounted on its base plate and contact yokes extend from these terminals through the lower switching device to the base plate of the upper switching device and are bent over to form contacts on the upper switching device base plate.

10 Claims, 2 Drawing Figures

STEERING COLUMN SWITCH

SUMMARY OF THE INVENTION

The invention relates to a switch to be mounted on the sterring column of an automotive vehicle and, more particularly, it concerns a switch providing a single switch housing within which two switching devices, such as a wiper and washer switch and a warning light switch, are positioned with each switching device being adjustably operable by its own switch lever.

For reasons of safety a driver should normally have his safety belt fastened and, as a result, switching devices are being shifted from the dashboard onto the steering column to make them more easily accessible. Accordingly since a plurality of switching devices require shifting, it is obvious to combine several switching devices, such as the wiper and washer switch and the warning light switch, in a single housing and to control them by means of separate switch levers.

This combination of switching devices results in a new larger steering column switch and has the disadvantage that the combined switching devices become costly and complex.

When using a direction indicator switch formed as a steering column switch a warning light switch is now often included.

It is an object of the invention to adapt a steering column switch of the kind referred to above so that only a first switching device, e.g. the wiper and washer switch, or both switching devices, e.g. wiper and washer switch and warning light switch, may be optionally incorporated without changing the construction of the individual switching devices somewhat thereby. In this manner the storage of spares and the replacement of the individual switching devices should be simplified.

In accordance with the present invention, a steering column switch for automotive vehicles incorporates two switching devices each adjustably operable via a separate switch lever. The devices are accommodated in a common switch housing, in which the first switching device is securable and optionally is covered by means of a cover plate or the second switching device.

By this selection of mounting and forming of the first switching device, e.g. the wiper and washer switch, it is possible to provide the steering column switch optionally with with one or both switching devices, and, if both switching devices are used, the second switching device acts as a cover for the first switching device.

The mounting of the switching devices in the switch housing is carried out in such a manner that the first switching device is securable to the housing by means of offset eyes of the switch housing, and the second switching device is mounted over the first switching device and recessed in the region of these eyes. Therefore, the securing means do not require modification and are independent of whether the steering column switch is provided with one or both switching devices. The two switching devices may be interconnected in such a manner that the two switching devices form a unitary structure, for example, by riveting, in which case the two switch levers are located one above the other and guided through a slot in the switch housing.

To simplify wiring the two switching devices, the terminals of the first switching device are located in its base plate and contact yokes are secured to this base plate, extend through the first switching device and the base plate of the second switching device. The contact yokes are bent over the base plate of the second switching device and form its contacts.

The switching devices and their coverings are incorporated within the switch housing which is formed as a cap open at the bottom, and the cap is closed by the base plate of the first switching device.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
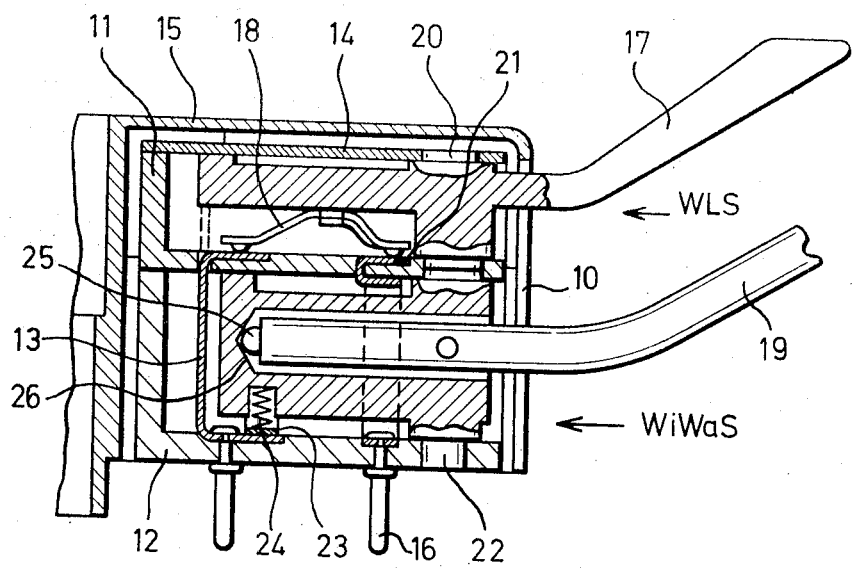
FIG. 1 is a sectional view of a steering column switch incorporating two switching devices.

In a cap-like switch housing 15 according to FIG. 1, positioned on the steering column of an automotive vehicle, the warning light switch WLS and the wiper and washer switch WiWaS are mounted and secured one above the other. Each switch has a separate switch lever 17 and 19 which are guided in a slot 10 in the switch housing 15.

The wiper and washer switch WiWaS has a base plate 12 supporting the terminal contacts 16. The lower switch WiWaS, including the contact bridges 23 supported via springs 24, is adjusted by means of the switch lever 19 and controls the different switch positions in accordance with the switched connections of the wiper and washer installation of the automotive vehicle. The lower switch is pivotally mounted in the pivots 22 in the base plate 12 and in the base housing 11 of the warning light switch WLS. The switch lever 19 is supported on a switch curve 26 of the switch member by means of a stop ball 25, so that an additional contact arrangement, not shown, may be actuated by vertical deflection of the switch lever 19.

In the base housing 11 of the warning light switch WLS the switch lever 17 positions the contact bridges 18, which co-operate with contacts formed by bending over contact plates 13 and 21 against the upper switch base housing. These contact plates are secured at their lower ends in the base plate 12 of the wiper and washer switch WiWaS, and then extend upwards through the lower switch and pass through the base housing 11 of the upper or warning light switch WLS. The upper end of the base housing 11 is closed by the cover plate 14 which is also formed with a pivot 20 for the switch lever 17.

Figure 2:
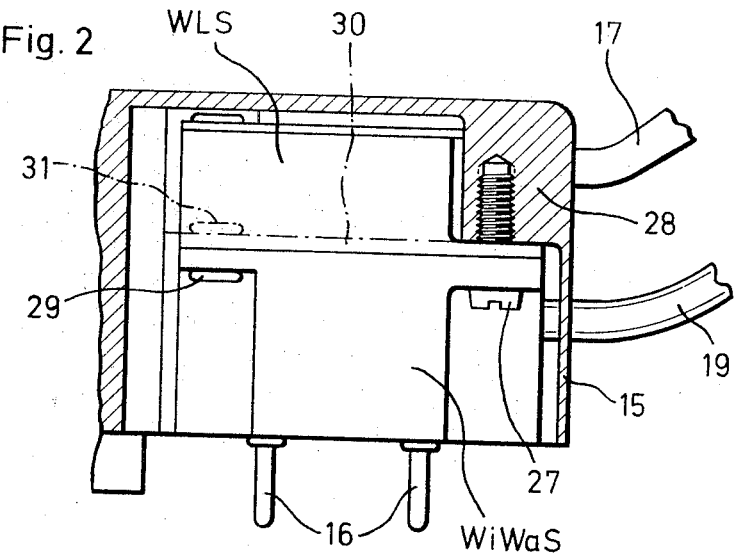
FIG. 2 is a sectional view offset relative to FIG. 1, which shows the mounting of the combined switching device in the switch housing.

As shown in FIG. 2, the two switches WiWaS and WLS are interconnected by rivets 29 into a unitary switch structure secured by screws 27 in offset eyes 28 of the switch housing 15. The warning light switch WLS is recessed in the region of these eyes 28.

As indicated in broken lines, the lower or wiper and washer switch WiWaS may also be closed by a cover plate 30, and the cover 30 is riveted to the base plate 12 of the switch, as indicated by the reference numeral 31. The wiper and washer switch WiWaS so closed is secured by means of screws 27 in the eyes 28 of the switch housing 15. In such an alternate arrangement, the space above the wiper and washer switch WiWaS is open. Therefore, the cover plate 30 provides the mounting for the wiper and washer switch WiWaS.

While a specific embodiment of the invention has been shown and described in detail to illustrate the application of the inventive principles, it will be understood that the invention may be embodied otherwise without departing from such principles.

What is claimed is:

1. A steering column switch for motor vehicles comprising a common switch housing, a first switching device and a second switching device mounted in said common housing, said common switch housing comprising two separate and distinguishable chambers for receiving said first and second switching devices, and a separate switch lever for each of said first and second switching devices.

2. A switch, as set forth in claim 1, wherein said first switching device is located below said second switching device and is secured to and covered by said second switching device.

3. A switch, as set forth in claim 1, wherein said first switching device includes a base plate member closed at its lower end and open at its upper ends within said housing, said second switching device positioned above and forming a closure for the upper end of said base plate member of said first switching device, and said switch lever for said first switching device pivotally mounted within said base plate member for said first switching device and extending laterally therefrom exteriorly of said housing.

4. A switch, as set forth in claim 1, wherein a cover plate is located within and above said first switching device in said common switch housing and forms a closure for the open upper end of said first switching device.

5. A switch, as set forth in claim 1, wherein said common switch housing has eyes formed therein offset from said switch levers, means for securing said first switching device in the offset eyes in said housing, and said second switching device being located above said first switching device and recessed in the region of the offset eyes in said housing.

6. A switch, as set forth in claim 1, including rivets for securing said first and second switching devices together to form a unitary structure.

7. A switch, as set forth in claim 6, wherein said second switching device is located above said first switching device, said switch housing having a slot extending upwardly therethrough and opening to the exterior of said housing, said switch levers of said first and second switching devices extending through the slot in said switch housing for access on the exterior of said housing.

8. A switch, as set forth in claim 1, wherein said first switching device having a base plate member located in the lower end of said common switch housing, said second switching device having a base plate located above said base plate of said first switching device, terminals for said first switching device positioned on said base plate of said first switching device, contact yokes secured to said base plate of said first switching device and extending through said first switching device and said base plate of said second switching device, and said contact yokes being bent over on said base plate of said second switching device and forming contacts for said second switching device.

9. A switch, as set forth in claim 1, wherein said common switch housing is formed as a cap open at its bottom and having a slot in its side through which said switch levers for said first and second switching devices extend, said first switching device having a base plate and said base plate forming a closure for the open lower end of said common switch housing.

10. A switch, as set forth in claim 1, wherein said common switch housing is cap-shaped and is open at its bottom with a vertically extending slot in one side thereof to permit said switch levers of said first and second switching devices to extend outwardly from said housing, said first switching device including a base plate member with a portion thereof forming a closure for the open lower end of said housing, said base plate member of said first switching device being open at its upper end within said housings, said second switching device having a base plate member having a portion thereof extending across and forming a closure for the upper end of said base plate member of said first switching device, means for securing said first and second switching devices together into a unit, means for securing said first switching device to said common switch housing, and said second switching device being recessed in the region thereof adjacent the connection of said first switching device to said common switch housing.

* * * * *

UNITED STATES PATENT OFFICE
CERTIFICATE OF CORRECTION

Patent No. 3873 788             Dated  March 25, 1975

Inventor(s)  Otto Machalitzky et al

It is certified that error appears in the above-identified patent and that said Letters Patent are hereby corrected as shown below:

In the heading of the patent, please insert:

--[73]  SWF-Spezialfabrik Fur Autozubehor
        Gustav Rau GmbH
        7120 Bietigheim, GERMANY Signed and sealed this 10th day of June 1975.

(SEAL)
Attest:

RUTH C. MASON
Attesting Officer

C. MARSHALL DANN
Commissioner of Patents
and Trademarks